United States Patent Office
3,489,835
Patented Jan. 13, 1970

3,489,835
ANTHELMINTIC COMPOSITIONS
Virgil H. Scroggs, P.O. Box 4370,
Fort Worth, Tex. 76106
No Drawing. Continuation of application Ser. No.
438,784, Mar. 10, 1965. This application May 12,
1969, Ser. No. 828,083
Int. Cl. A01n 11/02
U.S. Cl. 424—127   5 Claims

ABSTRACT OF THE DISCLOSURE

An anthelmintic composition for the treatment of internal parasites in the gastro-intestinal tract of ruminants comprising the product of a solution of copper sulphate, sodium arsenite, picric acid, cobalt sulphate, phosphoric acid, nonylphenoxy (ethyleneoxy) ethanol and water.

---

This application is a continuation application of Ser. No. 438,784, filed Mar. 10, 1965, now abandoned, which is a continuation of application Ser. No. 154,106 filed Nov. 20, 1961 and now abandoned.

This invention relates to an anthelmintic composition and process for its preparation and application. More specifically, it deals with a composition for the treatment of internal parasites of the digestive tract of ruminants. It aids in the elimination of tape worms (*Moniezie expansa*), common stomach worms, coccidia (*Eimeria zurni, Eimeria ellipsoidalis,* and *Eimeria bovis*Q in cattle, (*Eimeria arloingi*) in sheep and goats.

The problem of ridding animals of internal parasites has been the subject of a great amount of work over the past years. These parasites exist in three stages which makes the problem particularly difficult. The parasite at the first is in the egg stage which are laid in the stomach. These eggs are dropped to the ground in the feces of the animal. Here they may lie dormant for as long as a year and then form the larvae stage or, depending on weather conditions, may form the larvae stage soon after they are on the ground. These larvae then crawl onto the vegetation which is the natural food of the livestock. When livestock eat this vegetation, they swallow the larvae which attach themselves to the walls of the stomach or intestines or the animal, whereupon they suck blood from the stomach or intestine and infect the lining thereof. In the stomach or intestine, these parasites lay more eggs which in turn are dropped to the ground in the feces of the animal, completing the life cycle of the parasites. Because of these parasites living in the animal, the animal will become weakened and lose weight and, in more severe cases, die.

In treating these parasites heretofore, there have been many problems. Substances which are toxic to the parasites are toxic to the animal. There is also a problem of getting the toxicity out of the animal so that it will be available for human consumption. These parasites are of several kinds, and an agent which is effective against one is not effective against the other. These parasites cling to the walls of the stomach and/or intestine very strongly; and, even though remedies of the past have been effective, the parasites, by flipping, can break off at joints, leaving the head still attached and thus continue to grow again.

Another problem is the mucous in the stomach and/or intestine of the animal. This mucous is produced by the animal in an effort to aid the animal in warding off the worms or parasites by enveloping the parasites. This prevents the poisons of the anthelmintic composition from attacking these parasites enveloped in the mucous.

Another problem is to find an anthelmintic composition which, when administered, does not cause the animal to experience any shock or nausea which has resulted in the past in the slowing down or complete stoppage of the animal's eating habits.

It is an object of the present invention to produce a composition for the treatment of internal parasites which overcomes all of the problems mentioned above.

Another object of the invention is to provide a process for producing a composition which, while being pleasant to the taste and having no danger of injury to the animal, destroys parasites of the gastrointestinal tract of cattle, sheep and goats.

A further object is to produce a composition which not only destroys parasites in ruminants, penetrating mucous of stomach and intestinal linings, but also stimulates appetite and takes immediate effect without shock or nausea, repairs tissues damaged by worms, stimulates production of needed Vitamin $B_{12}$, cuts feed costs increasing forage and/or feed consumption, and restores normal health.

More specifically, it is the object of the present invention to produce a novel composition for destroying parasites of the digestive tract of ruminants by scientifically combining copper sulphate, sodium arsenite, picric acid, cobalt sulphate, phosphoric acid, and nonylphenoxypoly (ethyleneoxy) ethanol in such a way that they will have a maximum effect on the parasites.

A still further object of the present invention is to provide a composition for destroying internal parasites of ruminants which goes directly to the fourth stomach and intestines where parasites are stealing food and health.

It has been found that by scientifically combining by a special technique the ingredients of Table I below a very stable, extremely effective concentrate is formed which destroys parasites of the gastrointestinal tract in cattle, sheep and goats, goes directly to the fourth stomach and intestines where parasites are stealing food and health, penetrates mucous of stomach and intestinal linings to reach parasites that are deeply imbedded, stimulates production of greatly needed Vitamin $B_{12}$, stimulates vitality, appetite, and tone immediately with no shock, helps to repair tissues damaged by worms and stimulates digestive processes, restores normal health and promotes maximum growth, gains, and production, cuts feed costs and increases forage and/or feed conversion.

TABLE I

| | Percent |
|---|---|
| Copper sulphate | 6.0–10 |
| Sodium arsenite | .5–1.25 |
| Picric acid | .1–.25 |
| Cobalt sulphate | .1–1.00 |
| Phosphoric acid | 3–15 |
| Nonylphenoxypoly (ethyleneoxy) ethanol | .05–.5 |
| pH | .90–3.2 |
| Balance water. | |

The composition is prepared in the following manner. Copper sulphate is dissolved in water at 180° F. and added to phosphoric acid and mixed well. The water used is part of the water to be contained in the final composition. Next sodium arsenite is dissolved separately in part of the final water composition at 180° F. The sodium arsenite solution is now added to the copper sulphate and phosphoric acid solution. Picric acid is now added, followed by the addition of cobalt sulphate and nonylphenoxypoly (ethyleneoxy) ethanol in that order. Finally, sufficient water is added to complete the solution.

The presence of extra hydrogen atoms in the above composition is extremely important. These hydrogen atoms are produced by phosphoric acid which acts as a carrier for the poisons and also relieves the toxicity of the poisons. The nonylphenoxypoly (Ethyleneoxy)

ethanol acts as a cleaner which dissolves or removes the mucous from the stomach and gastorintestinal tract, allowing the poisons to act directly on the parasite common to the gastorintestinal tract.

Mucous or a mucoid cover is produced by the animal in an effort to aid the animal in warding off the worms or parasites by enveloping the parasites. The nonylphenoxypoly (Ethyleneoxy) ethanol removes this mucous so that the poisons can attack the parasite. Also eggs which are laid by the parasite in the mucous are carried out, causing the animal to pass off an increased amount of eggs in the fecal matter, thereby removin the possibility of the eggs hatching and re-infesting the animal. The mucous is removed first as it slows down the action of the poisons in that the poison does not penetrate the mucous immediately. Also, the larvae which are deep within the mucous are not reached by the poisons until after the removal of the mucous. Besides this, those parasites which may be in the pockets or villi and walls of the stomach and intestinal tract are attacked by picric acid which covers the walls and pockets or villi from 42 to 78 hours. In order for the picric acid to affect in this way, most of the mucous must be removed to allow it to penetrate.

The poisons which act on the parasites are copper sulphate, sodium arsenite, and picric acid. The poisons have no toxic effect on humans who may eat the meat or drink the milk from treated animals who have taken them internally within 96 hours. After the recommended level of treatment, all poisons used in treatment are passed off from the animal in 96 hours through urinary or fecal tracts.

The picric acid, while being a poison, also aids in healing the walls of the gastrointestinal tract and helps to reduce irritation or inflamed conditions of said walls produced by both the parasites and the poisons. The picric acid also works as an anesthetic on the worms, causing them to release their grip on the stomach walls. This prevents the worms from breaking off below the head and continuing to grow.

The cobalt sulphate is used primarily to produce Vitamin $B_{12}$ and with the elemental copper and phosphorous aids the gastric juices and enzymes to stimulate the animal to eat while at the same time prevents shock and nausea of the animal which usually causes a stoppage or slowing down of eating habits.

The cobalt, copper and phosphorous are present in a sufficient amount to increase the enzymatic action even though the acidic matter of the compositions may also increase gastric juices and enzymes. If these elements were not present, the medicine itself would have little effect on increase of the appetite.

A more preferred composition is that given below in Table II.

TABLE II

| | Percent by amount |
|---|---|
| Copper sulphate | 8 |
| Sodium arsenite | .8 |
| Picric acid | .15 |
| Cobalt sulphate | .15 |
| Phosphoric acid | 5.0 |
| Nonylphenoxypoly (ethyleneoxy) ethanol | .2 |
| pH | 1.0–2.50 |

Balance water.

The composition of Table I has its best results when given at the following times. The animal should be treated about two weeks before breeding season, and this treatment should be repeated in 14 to 21 days. The first treatment will kill the adult worms and the second treatment gets the young worms which may have been buried in the mucous and the membranes and, at the same time, effects the eating and stimulating process. Treatment before breeding improves breeding conditions, increasing the lamb, goat, or calf crop.

Secondly, the animals should be treated again approximately three weeks before time for dropping calves, lambs, or kids, repeating the treatment in about 14 days. At this time, treatment maintains parasite control at a most critical time, improves conditions, stimulates birth of stronger, livelier youngsters, causes better milk production and faster growth and development.

It is particularly well known that cows become more heavily infested with parasites while on green pasture and particularly during the gestation or dry period than at any other time. Treatment soon after the end of the gestation period has tremendous effects on total milk production.

Calves, lambs and kids should be treated from 30 to 60 days after birth or when symptoms indicate the need. Young animals are more heavily infested while on green pasture. Treatment helps to control infection, increase said animals, and stimulate faster growth and better market gains.

The anthelmintic effectiveness of the above composition following oral administration is demonstrated by the following tests.

TEST I

Species: Sheep; Breeds: Crossbred; Sex: M; Age: Yr.; Weight: 62½ lb.; Tag. No: 5.
Tests: Fecal samples from sheep for stoll count:
 #5 (6/19/61)
 #5 (6/24/61)

Stoll count (6/19/61)

| | | |
|---|---|---|
| Coccidia | | 100 |
| Cestodes | 100 | 100 |
| *Moniezia expansa* | 100 | |
| Nematodes | | 46,000 |
| Possible identification: | | |
| *Haemonchus contortus* (Twisted stomach worm) | 300 | |
| *Strongyloides papillosis* (Threadworm) | 300 | |
| *Trichuris globulosa* (Whipworm) | 500 | |
| *Oesophagostromum columbianum* (Nodular worm) | 21,000 | |
| *Chabertia ovina* (Large mouthed bowel worm) | 4,900 | |
| *Bunostomum trigonocephalam* (Hookworm) | 3,600 | |
| *Trichostrongylus sp.* (Stomach hairworms) | 16,000 | |
| Total count/gram | 46,700 | |

Stoll count (6/24/61)

| | | |
|---|---|---|
| Coccidia | | None seen |
| Cestodes | | None seen |
| Nematodes | | 1,600 |

| Possible identification: | | Reduction |
|---|---|---|
| *Haemonchus contortus* (Twisted stomach worm) | 100 | 66.7% |
| *Strongyloides papillosus* (Threadworm) | 100 | 66.7% |
| *Trichuris globulosa* (Whipworm) | 100 | 80.0% |
| *Oesophagostromum columbianum* (Nodular worm) | 500 | 97.62% |
| *Chabertia ovina* (Large mouthed bowel worm) | 100 | |
| *Bunostromum trigonocephalum* (Hookworm) | 400 | 88.89% |
| *Trichostrongylus sp.* (Stomach hairworm) | 200 | 98.75% |
| Unidentified larva | 100 | |
| Total count/gram | 1,600 | |
| Reduction | | 96.57% |

Species: Sheep; Breeds: Crossbred; Sex: M; Age :Yr.; Weight: 61½ lb; Tag. No.: 5
Test: Stoll count #5; 3-stomach and intestinal tract for parasites; #5 Sample obtained from terminal portion of the intestinal tract.

Stoll count (6/30/61)

| | |
|---|---|
| Coccidia | None seen |
| Cestodes | None seen |
| Nematodes | 1,800 |

| Possible identification: | | Reduction |
|---|---|---|
| *Trichuris globulosa* (Whipworm) | 100 | 94.45% |
| *Oesophagostomum columbianum* (Nodular worm) | 600 | 66.67% |
| *Chabertia ovina* (Large mouthed bowel worm) | 300 | 83.35% |
| *Trichostrogylus sp.* (Stomach hairworm) | 400 | 77.80% |
| Unidentified larvae | 400 | 77.80% |
| Total count/gram | 1,800 | |

Post examination of intestine and stomach

Gross examination intestinal tract, reveals the mucous surface to be healthy in appearance. No evidence of irritation is present.
Microscopic examination of contents of cecum reveals a moderate number of *Trichuris globulosa* (Whipworm) and *Oesophagostomum columbianum* (Nodular worm.).
Contents from lumen of the small intestine contain four portions of tapeworm, ranging in length of 3 cm. to 6cm. Each portion of tapeworm had an attached scolex which microscopic examinations revealed to be *Moniezie expansa*. No scolices were found attached to the intestinal wall.
Gross and microscopic examination of stomach and abomasum revealed no parasites.

TEST II

Species: Sheep; Breeds: Crossbred; Sex: M; Age: Yr;. Weight: 61 lbs.; Tag. No: 2.
Tests: Fecal samples from sheep for stoll count sample:
  #348 (7/12/61)
  #348 (7/17/61)

Stoll count (7/12/61)—Pre-dosing

| | |
|---|---|
| Coccidia | 15,500 |
| Eimeria arloingi | 15,000 |
| Cestodes | None seen |
| Nematodes | 90,200 |
| Possible identification: | |
|   Bunostomum trigonocephalum (Hookworm) | 17,400 |
|   Chabertia ovina (Large mouthed bowel worm) | 11,000 |
|   Haemonchus controtus (Twisted stomach worm) | 6,400 |
|   Oesophagostomum columbianum (Nodular worm) | 21,100 |
|   Trichostrongylus sp. (Stomach hairworm) | 25,400 |
|   Trichuris globulosa (Whipworm) | 1,300 |
|   Ostertagia circumcinta (Medium stomach worm) | 7,500 |
| Unidentified larvae | 1,300 |
| Total count/gram | 106,600 |

Stoll count (7/17/61) Post-dosing

| | | Reduction |
|---|---|---|
| Coccidia | 800 | 94.70% |
| Eimeria arloingi | 800 | |
| Cestodes | None seen | |
| Nematodes | 2,900 | |
| Possible identification: | | |
|   Bunostomum trigonocephalum (Hookworm) | 400 | 97.70% |
|   Chabertia ovina (Large mouthed bowel worm) | None seen | 100.00% |
|   Haemonchus contortus (Twisted stomach worm) | 400 | 93.75% |
|   Oesophagostomum columbianum (Nodular worm) | 700 | 96.70% |
|   Trichostromgylus sp. (Stomach hairworm) | 900 | 96.46% |
|   Trichuris globulosa (Whipworm) | 500 | 61.54% |
|   Ostertagia circumcinta (Medium stomach worm) | None seen | 100.00% |
| Unidentified larvae | 200 | 84.62% |
| Total count/gram | 3,900 | |
| Reduction | | 96.34% |

The above tests show the preferred dose to be 1 cc. for each 10 pounds of the body weight to be taken orally. The dose shows marked action against the gastrointestinal parasites and also a marked action against immature worms. Marked clinical improvement with cessation or scouring and stimulation of appetite after treatment also could be noticed within 24 hours. There was also no toxic or ill effect when a dose three times the preferred dosage was given. The tests show that the composition was 96.57% effective against parasites of the gastrointestinal tract.

I claim:

1. A stable vermifuge composition for the treatment of gastrointestinal worms of ruminants comprising the product obtained by mixing 6% to 10% copper sulphate; .5% to 1.25% sodium arsenite; .1% to .25% picric acid; .1% to 1% cobalt sulphate; 3% to 15% phosphoric acid; .05% to .5 nonylphenoxypoly(ethyleneoxy) ethanol; and the remainder water.

2. The composition of claim 1 having a pH of between .90 and 2.50.

3. A stable vermifuge composition for the treatment of gastrointestinal worms of ruminants comprising the product obtained by mixing 8% copper sulphate; .8% sodium arsenite; .15% picric acid; .15% cobalt sulphate; 5% phosphoric acid; .2% nonylphenoxypoly(ethyleneoxy) ethanol; and the remainder water.

4. A composition of claim 3 having a pH of between 1 and 2.50.

5. A method of treating internal worms of ruminants comprising administering orally the composition of claim 1 in the proportion of 1 cc. to 3 cc. per 10 pounds of body weight of animal daily.

References Cited

UNITED STATES PATENTS

| | | | |
|---|---|---|---|
| 2,280,340 | 4/1942 | Miller et al. | 167—53 |
| 2,213,477 | 9/1940 | Steindorff et al. | 167—85 |
| 1,839,970 | 1/1932 | Konantz | 167—53 |

OTHER REFERENCES

Levine, Am. J. Vet. Research, vol. 29, 1958, pp. 299–303 (167—55W).

Milks, Practical Veterinary Pharmacol. Materia, Medica & Therapeutics, 1949, pp. 334, 497, 521, 575.

The Merck Index, Sixth edition, 1952, Merck & Co., p. 259.

FRANK CACCIAPAGLIA, Jr., Primary Examiner

U.S. Cl. X.R.

424—128, 134, 143, 315, 341